United States Patent
Kotlarski

(10) Patent No.: US 6,427,282 B1
(45) Date of Patent: Aug. 6, 2002

(54) WIPER BLADE FOR AUTOMOBILE GLASS PANELS

(75) Inventor: Thomas Kotlarski, Bad Neuenahr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,746

(22) PCT Filed: Jul. 31, 1999

(86) PCT No.: PCT/DE99/02369
§ 371 (c)(1),
(2), (4) Date: Aug. 7, 2000

(87) PCT Pub. No.: WO00/34089
PCT Pub. Date: Jun. 15, 2000

(30) Foreign Application Priority Data

Dec. 7, 1998 (DE) .......................... 198 56 279

(51) Int. Cl.[7] .............. B60S 1/40; B60S 1/38
(52) U.S. Cl. ............. 15/250.32; 15/250.43; 264/273; 264/274; 264/271.1; 29/897.2
(58) Field of Search ............ 15/250.43, 250.32, 15/250.44, 250.48, 250.451, 250.452, 250.453, 250.454, 250.361; 264/273, 274, 271.1; 29/897.2

(56) References Cited

U.S. PATENT DOCUMENTS 3,132,367 A * 5/1964 Wise ................ 15/250.32
3,317,945 A   5/1967 Ludwig ............ 15/250.48
3,390,416 A * 7/1968 Scinta .............. 15/250.32
4,014,061 A * 3/1977 Jurauski et al. ...... 15/250.32

FOREIGN PATENT DOCUMENTS

| DE | 1 247 161 | 1/1970 | |
|---|---|---|---|
| DE | 26 14 457 | 10/1976 | |
| DE | 27 13 384 A | 10/1977 | |
| DE | 28 43 164 A | 4/1979 | |
| DE | 197 29 865 A | 1/1999 | |
| GB | 1429820 | * 3/1976 | ......... 15/250.43 |

* cited by examiner

Primary Examiner—Gary K. Graham
(74) Attorney, Agent, or Firm—Michael J. Striker

(57) ABSTRACT

A wiper blade is proposed that is used to clean windows of motor vehicles. The wiper blade (10) has an elongated, rubber-elastic wiper strip (14), which is retained, substantially parallel to the longitudinal axis, on a support element (30) that has a spring-elastic retaining rail (12) elongated in bandlike fashion and a connection device (16) disposed on the retaining rail, in which the connection device (16) is disposed on the band face (32), remote from the window, on the middle portion of the retaining rail (12) and serves to connect the wiper blade (10) to a driven wiper arm that can be stressed toward the window. Advantages in terms of both production and use are obtained if the connection device (16), made from a plastic, is formed directly and immovably onto the retaining rail.

9 Claims, 2 Drawing Sheets

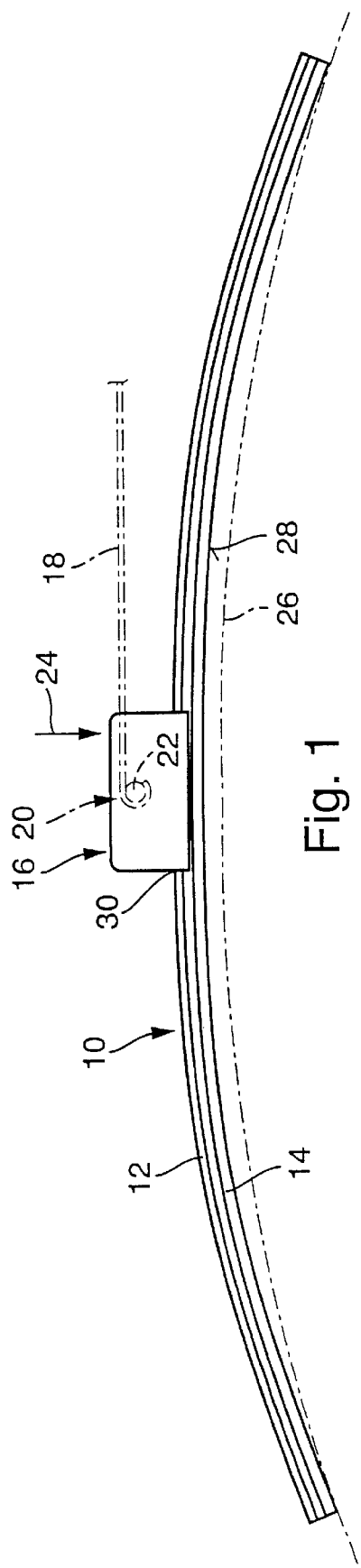
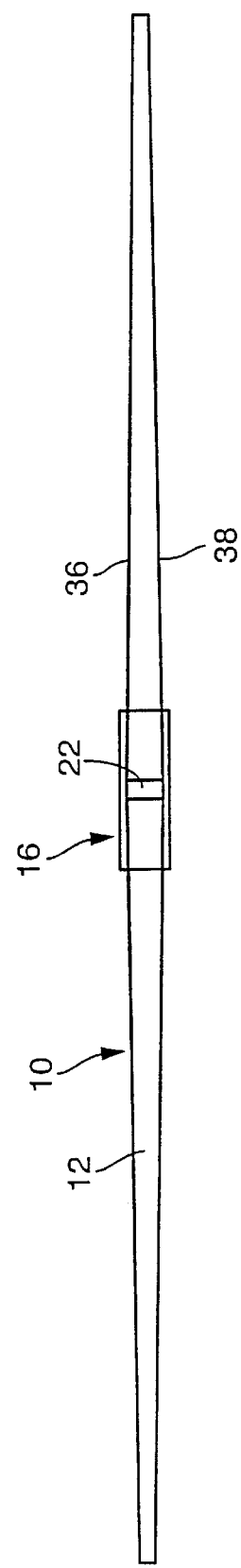

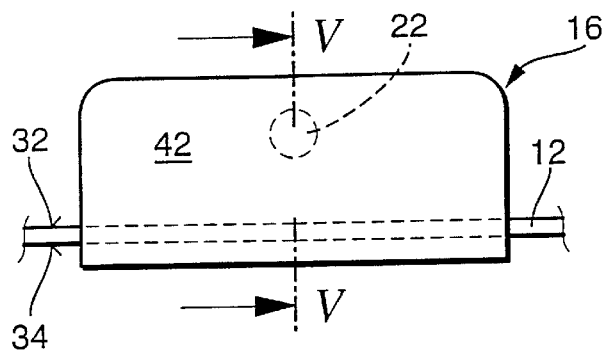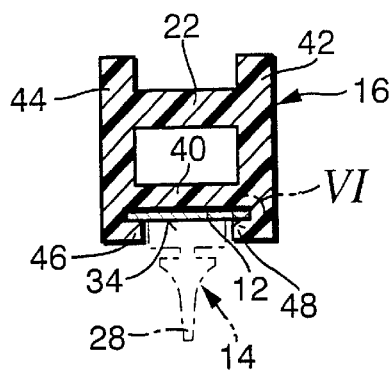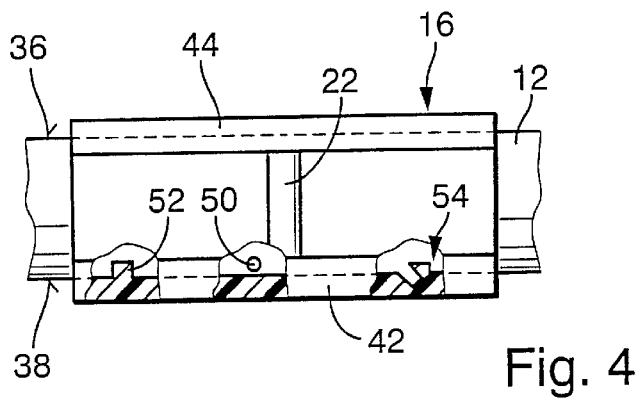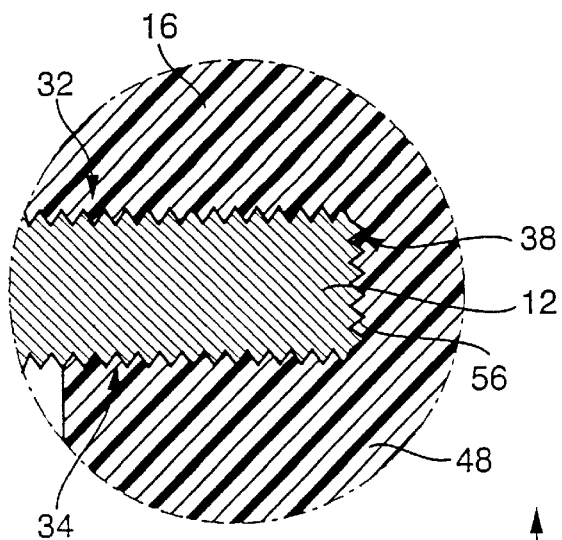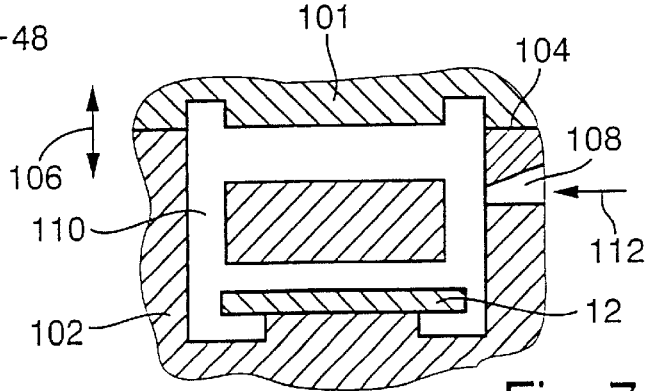

WIPER BLADE FOR AUTOMOBILE GLASS PANELS

PRIOR ART

In wiper blades for windows of motor vehicles having elongated, rubber-elastic wiper strips which are pressed against the window to be wiped and which is retained on a support element that has an elongated, bandlike spring-elastic retaining rail, the retaining rail is intended to assured the most uniform possible distribution, over the entire field swept by the wiper blade, of the contact pressure of the wiper blade on the window, which pressure originates in the wiper arm. Because of an appropriate curvature of the unstressed retaining rail—that is, when the wiper blade is not resting on the window—the ends of the wiper strip, which in wiper blade operation are placed fully against the window, are urged by the then-tensed retaining rail toward the window, even if the radii of curvature of spherically curved vehicle windows differ in each wiper blade position. Accordingly, the curvature of the wiper blade has to be somewhat greater than the greatest curvature measured in the field to be swept of the window to be wiped. The retaining rail thus replaces the complicated support bracket construction with two spring rails, disposed in the wiper strip, of the kind used in conventional wiper blades.

In a known wiper blade of this type (German Patent Disclosure DE-OS 26 14 457), the connection device is integrally joined to the retaining rail. Accordingly, it is made of the same material as the retaining rail. This may be of only secondary importance, as long as the retaining rail is made of a plastic and is produced by filling a suitable mold. If the retaining rail is to be made of metal, however, two diametrically contradictory demands are involved. That is, first, the retaining rail must have good spring properties; second, however, the extensions of the connection device must be bent by about 90° out of the plane of the retaining rail and fixed in that position without problems, so that the loads between the wiper blade and the wiper arm can be absorbed on stop faces of these extensions. These two demands are practically impossible to meet, unless disadvantageous compromises in terms of the choice of material are made.

In another known wiper blade (German Patent Disclosure DE-AS 12 47 161), the retaining rail is provided with a connection device embodied as a separate component. This connection device is solidly joined to the retaining rail with the aid of rivets. The requisite bores in the retaining rail, however, lead to an undesired, because uncontrollable, change in the retaining rail tension, making a satisfactory wiper outcome unattainable.

ADVANTAGES OF THE INVENTION

In the wiper blade defined by the body of claim 1, conversely, a choice of material that meets the demands made of each component can be made for both the retaining rail and the connection device. The joining of the two components to one another is done without problems and inexpensively by forming the connection device onto the prefabricated retaining rail. The forming-on is attained by placing the retaining rail in a casting mold or injection mold, which after closure is filled with a plastic that meets the demands. The retaining rail is then provided with the required connection device, and no further assembly steps are needed. Experiments have shown that by the forming on of the connection device, a sufficiently solid connection is made between the connection device and the retaining rail.

An especially reliable connection between the retaining rail and the connection device is attained if the connection device is provided with clawlike extensions, which at least intermittently clasp the two side longitudinal edges of the retaining rail and rest on the band face, toward the window, of the retaining rail.

If the retaining rail is provided with shoulders, with which counterpart shoulders of the connection device are associated, then an absolutely immobile connection, secured against shifting, is obtained between the retaining rail and the connection device, because counterpart shoulders occur automatically in the molding of the connection device and cooperate with the shoulders of the retaining rail.

The shoulders can be embodied in simple way at apertures and/or recesses open at the edge and/or shaped hooklike features of the support element.

A further improvement in the fastening of the connection device to the retaining rail is achieved by roughened features, which are provided at least on the surfaces of the retaining rail that are oriented toward the connection device.

An especially compact wiper blade is obtained if the retaining rail is made from a metal.

In order to provide the retaining rail with a connection device for the wiper arm in an economical way and in the process ideally satisfy the contradictory demands of the retaining rail and the connection device, a fastening method according to the invention is used, in which the prefabricated retaining rail is placed in a mold, which after closure is filled with hardenable plastic, so that after the mold is opened, the finished support element can be removed.

Further advantageous refinements and embodiments of the invention are disclosed in the ensuing description of an exemplary embodiment shown in the associated drawing and in a drawing figure that explains the claimed and described production method.

DRAWING

In the drawing:

FIG. 1 is a side view of a wiper blade;

FIG. 2 is a plan view on the wiper blade of FIG. 1;

FIG. 3, in an enlarged front elevation view, shows the middle portion of a support element belonging to the wiper blade of FIG. 1;

FIG. 4, partly in section, is a plan view on the arrangement of FIG. 3;

FIG. 5 is a section through the arrangement of FIG. 3 taken along the line V—V;

FIG. 6 is an enlarged view of a detail, marked VI in FIG. 4; and

FIG. 7 is a section through a closed casting mold with a retaining rail placed in it before the mold is filled with plastic, for forming the connection device onto the retaining rail.

DESCRIPTION OF THE EXEMPLARY EMBODIMENT

A wiper blade 10 shown in FIGS. 1 and 2 has an elongated, spring-elastic retaining rail 12, to the underside of which an elongated, rubber-elastic wiper strip 14 is secured, parallel to the longitudinal axis. In the middle portion of the top side of the retaining rail 12, which is made of a spring-elastic material, there is a connection device 16, with the aid of which the wiper blade can be separately connected pivotably to a driven wiper arm 18. The wiper arm is guided by one end, not shown, on a vehicle body. A hook acting as a counterpart connection means is formed onto the other, free end 20 of the wiper arm 18 and clasps a pivot bolt 22 (FIG. 1) belonging to the connection device 16 of the wiper blade. The securing between the wiper arm 18 and the wiper blade 10 is taken on by securing means, not shown in detail but known per se and embodied as adapters. The wiper arm 18 and thus the wiper blade as well are urged in the direction of the arrow 24 toward the window to be wiped, whose surface to be wiped is indicated in FIG. 1 by a dot-dashed line 26. Since the dot-dashed line 26 is intended to represent the greatest curvature of the window surface, it can be seen clearly that the curvature of the wiper blade, resting with both ends on the window, is greater than the maximum window curvature. Under the contact pressure (arrow 24), the wiper blade presses with its wiper lip 28 over its entire length against the window surface 26. In the process, a tension builds up in the spring-elastic retaining rail 12 that assures proper contact of the wiper strip 14, or its wiper lip 28, with the window over the entire length of the wiper strip or wiper lip. The retaining rail 12, together with the connection device 16 disposed on it, forms a support element 30 for the wiper strip 14; this support element is to be connected to the wiper arm 18 via its connection device 16.

Below, the structure of the support element 30 in particular will be described in detail in conjunction with FIGS. 3–6. As FIGS. 2 and 5 show in particular, the retaining rail 12 is embodied as a bandlike, elongated component, which is made of a spring-elastic material. In FIGS. 1 and 3, the retaining rail 12 has a band face 32, which is oriented away from the surface 26 of the window to be wiped. The other band surface, which is oriented toward the window surface 26, is identified by reference numeral 34. The retaining rail 12 also has two opposed side edges 36 and 38, extending longitudinally of the retaining rail 12. The support element 16 has a substantially U-shaped cross section. Thus it has a base 40 of the U and two legs 42 and 44, spaced apart from one another and attached to the base of the U. As FIGS. 2, 4 and 5 show, the two legs 42 and 44 of the U hold the pivot bolt 22. Each of the two legs 42 and 44 of the U is provided with a clawlike extension 46 and 48, each of which is disposed on the outside of the base 40 of the U and clasps the two longitudinal side edges 36, 38 of the retaining rail 12 in such a way that they rest on the band face 34, toward the window, of the retaining rail 12. In the exemplary embodiment, the clawlike extensions 46 and 48 extend over the full length of the connection device 16. So that the elasticity of the retaining rail 12 will be less impaired, it is also conceivable to provide a plurality of spaced-apart clawlike extensions on the base 40 of the U, which clasp the retaining rail 12 as described.

Because the forming of the connection device 16 onto the metal retaining rail 12 is done by means of a heated and hence flowable plastic, in the cooling operation that follows the casting, or in the attendant shrinkage of the plastic, an immovable seat of the connection device on the retaining rail 12 is obtained that is adequate in some cases. Under difficult conditions, it can be advantageous if the retaining rail 12 is provided with shoulders, to which counterpart shoulders of the connection device are assigned. These shoulders can be embodied, as shown in FIG. 4, by providing the retaining rail with apertures 50, whose walls form the shoulders (FIG. 4), in the region covered by the clawlike extensions 46 and 48. Another possibility for forming the shoulders can be attained by providing recesses 52 open at the edge or shaped hooklike features 54. Both the recesses and the shaped features 54 are shown in FIG. 4. In the process of forming the connection device onto the retaining rail as already described above, the liquid plastic is forced into the apertures 50 or the recesses 52 open at the edge or the shaped hooklike features 54 and hardens there and forms the counterpart shoulders that cooperate with the shoulders. To further improve the seating of the connection device 16 on the retaining rail 12, it can be expedient if the retaining rail 12, at least in the region which is covered by parts of the connection device, is provided on its upper or band faces 32, 34 with toothlike or corrugated toughened features 56. It is understood that these roughened features 56 can also be disposed on the side edges 36 and 38 of the retaining rail 12. These roughened features are preferably formed without metal-cutting machining and can either extend linearly or be embodied in spotlike shape.

The production method for the support element 60 will now be described in conjunction with FIG. 7. The casting mold required for it, in the basic illustration shown, has two mold halves 101 and 102, which rest against one another at a parting seam 104. Once fastened in a suitable apparatus, the mold 101, 102 can be opened by moving the two mold halves 101 and 102 relative to one another as indicated by the double arrow 106. One of the two mold halves 102 also has a fill opening 108. A casting chamber 110, which is adapted to the shape of the connection device 16 (FIGS. 3–5), is machined into the casting mold 101, 102. The fill opening 108 opens into the casting chamber 110.

The production method proceeds as follows: The casting mold 101 and 102 is opened by contrary motion (double arrow 106) of the mold halves 101 and 102. The retaining rail 12 is then placed in the mold half 102. After the closure of the mold 101, 102—in which the mold halves 101 and 102 are moved counter to the double arrow 106 until the mold halves 101 and 102 rest on one another at the parting seam 104—the retaining rail 12 is fixed in prescribed position in the mold half 102. Through the fill opening 108, heated and hence flowable plastic is now introduced into the casting chamber 110 in the direction of the arrow 112. After this chamber is filled and after suitable cooling of the plastic, the mold 101, 102 can be opened again and the finished support element 30 can be taken out. It should be noted in particular that the shape of the mold 101, 102 is merely intended to indicate the basic design of a casting or injection mold of this kind. Technical requirements in casting—such as the unmoldability of the support element 30—have not been addressed here.

What is claimed is:

1. A wiper blade (10) for windows of motor vehicles, having an elongated, rubber-elastic wiper strip (14) which can be pressed against the window (26) to be wiped and which is retained, substantially parallel to a longitudinal axis, on a support element (30) that has an elongated spring-elastic retaining rail (12) forming a band with a band face and a connection device (16) disposed on the retaining rail, in which the connection device (16) is disposed on the band face, remote from the window (26), on the middle portion of the retaining rail (12) and serves to connect the wiper blade (10) to a driven wiper arm (18) that can be stressed toward the window, characterized in that the connection device (16) is distinct from said wiper strip and formed directly onto the retaining rail (12) by means of a heated, and thereby flowable, plastic, and wherein, upon cooling and contraction of said plastic, said connection device is immovably seated onto said retaining rail (12).

2. The wiper blade of claim 1, characterized in that the connection device is provided with claw shaped extensions (46, 48), which at least intermittently clasp two longitudinal edges (36, 38) of the retaining rail (12) and rest on the band face (34), toward the window, of the retaining rail (12).

3. The wiper blade of claim 1, characterized in that the retaining rail (12) is provided with shoulders, with which counterpart shoulders of the connection device (16) are associated.

4. The wiper blade of claim 3, characterized in that the shoulders of the retaining rail are embodied on apertures (50).

5. The wiper blade of claim 3, characterized in that the shoulders of the retaining rail are embodied on recesses (52) that are open at a longitudinal edge of the retaining rail.

6. The wiper blade of claim 3, characterized in that the shoulders of the retaining rail are embodied on hook-shaped features (54).

7. The wiper blade of claim 1, characterized in that the retaining rail (12) is provided with roughened features (56) on at least one of its surfaces oriented toward the connection device (16).

8. The wiper blade of claim 1, characterized in that the retaining rail is made from a metal.

9. A method for fastening the plastic connection device of the wiper blade of claim 1 to the retaining rail (12), characterized in that the retaining rail is placed in a mold (102,104), which after closure is filled with hardenable plastic forming said connection device, so that after the mold is opened, the finished connection device immovably seated on said retaining rail can be removed.

* * * * *